(12) United States Patent
Volk

(10) Patent No.: US 7,154,683 B1
(45) Date of Patent: Dec. 26, 2006

(54) FIVE-ELEMENT OPTICAL DEVICE

(76) Inventor: Brian E Volk, 70 North St., Jefferson, MA (US) 01522

( * ) Notice: Subject to any disclaimer, the term of this patent is extended or adjusted under 35 U.S.C. 154(b) by 0 days.

(21) Appl. No.: 11/160,721

(22) Filed: Jul. 6, 2005

(51) Int. Cl.
*G02B 9/60* (2006.01)
*G02B 25/00* (2006.01)

(52) U.S. Cl. .................. 359/769; 359/643
(58) Field of Classification Search ........ 359/643–645, 359/769
See application file for complete search history.

(56) References Cited

U.S. PATENT DOCUMENTS

| | | | |
|---|---|---|---|
| 716,035 A | 12/1902 | Harting | 359/786 |
| 1,421,156 A | 6/1922 | Booth | 359/786 |
| 2,346,061 A | 4/1944 | Altman | 359/768 |
| 2,348,667 A | 5/1944 | Warmisham | 359/769 |
| 2,586,866 A | 2/1952 | Schade | 359/769 |
| 2,645,156 A | 7/1953 | Tronnier | 359/786 |
| 2,645,157 A | 7/1953 | Lowenthal | 359/789 |
| 2,831,397 A | 4/1958 | Berger et al. | 359/765 |
| 2,885,928 A | 5/1959 | Baker | 359/648 |
| 2,900,871 A | 8/1959 | Baker | 359/645 |
| 2,959,102 A | 11/1960 | Cook | 359/765 |
| 3,586,418 A | 6/1971 | Abe | 359/644 |
| 3,612,662 A | 10/1971 | Sissel | 359/643 |
| 3,658,412 A | 4/1972 | Seaman | 359/644 |
| 3,922,072 A | 11/1975 | Rogers | 359/644 |
| 3,958,866 A * | 5/1976 | Matsubara | 359/755 |
| RE29,856 E * | 12/1978 | Kano | 359/674 |
| 4,929,066 A * | 5/1990 | Wakimoto et al. | 359/663 |
| 6,181,479 B1 | 1/2001 | Koizumi | 359/645 |
| 6,367,954 B1 | 4/2002 | Futami | 362/297 |
| 6,414,798 B1 | 7/2002 | Koizumi | 359/643 |

* cited by examiner

*Primary Examiner*—Jordan Schwartz
(74) *Attorney, Agent, or Firm*—George A. Herbster

(57) ABSTRACT

An optical device with five air-spaced optical elements. An optical device in the form of an eyepiece is disclosed with a center negative lens and two outer positive lenses on each side of the intermediate negative lens. The eyepiece transmits light from an object to an exit pupil along angles corresponding to the position of a focus point on an object. In a preferred embodiment the positive lenses are identical.

15 Claims, 3 Drawing Sheets

FIVE-ELEMENT OPTICAL DEVICE

FIELD OF THE INVENTION

This invention generally relates to optical systems comprising one or more optical devices and more particularly to a lens form adapted for use in a variety of optical devices.

DESCRIPTION OF RELATED ART

Optical systems include one or more of a variety of optical devices. A particular application will determine the selection of specific optical devices to be included in the optical system. As an example, in the medical field optical systems serve as endoscopes. A rigid endoscope includes multiple optical devices, namely: an objective, a relay and an eyepiece. In the photographic field a camera as an optical system includes an objective as an optical device. Monoculars and telescopes incorporate eyepieces to present an image for viewing. Night vision systems include an optical device in the form of an eyepiece for allowing a user to view an image projected from the phosphor output screen of an image intensifier tube.

Significant efforts have been made to develop lens forms for each of the foregoing and other optical devices. Some of these efforts have led to highly specialized lens forms that are adapted for a single use, such as an objective for a camera, but not for use with another type of optical device, such as a relay. In these applications the number and attendant costs of optical elements, such as lenses or mirrors, are secondary to requisite image quality. For other applications, a lens designer seeks to produce a lens based upon a lens form that essentially satisfies optical requirements for the application with the fewest possible optical elements. In such applications the lens designer may also address issues such as physical size, weight and manufacturing costs.

For example, U.S. Pat. No. 716,035 (1902) to Harting, U.S. Pat. No. 1,421,156 (1922) to Booth, U.S. Pat. No. 2,645,156 (1953) to Tronnier and U.S. Pat. No. 2,645,157 (1953) to Lowenthal disclose photographic objectives having as a lens form three air-spaced lens elements. Each has an intermediate optical element comprising a "negative" singlet lens; the outer two optical elements comprise doublet lenses that have the characteristics of a "positive" lens.

As used herein, the terms "positive" and "negative" follow industry practices for optical devices using lenses with centered, flat or spherical surfaces. A "positive" lens has a positive effective focal length and typically has a thicker central thickness along a central axis than edge thickness. A "negative" lens has a negative effective focal length and typically has a thinner central thickness along a central axis than an edge thickness.

In each of the foregoing photographic objectives the lens form uses lenses to control the Petzval Sum for the optical device. The Petzval Sum is a measure of the curvature of an image from any lens element or group of lens elements in an optical device. This value is obtained by summing, for each lens element in the optical device, the product of the lens element power and refractive index of the glass for that lens element. As the Petzval Sum decreases, the curvature of the image also decreases. However, the lenses in the foregoing references are characterized by other aberrations to blur fine lines thereby to provide a "soft" image.

U.S. Pat. No. 2,586,866 (1952) to Schade discloses a high aperture five-component objective including a central biconvex negative lens and four positive lenses. The positive lenses are concave-convex or bi-convex lenses, and the second interlens space from the front of the objective has the largest dimension. This configuration has the object of projecting a focused image onto a curved surface that is concave toward the objective.

U.S. Pat. No. 2,900,871 (1959) to Baker disclose a magnifier with three air-spaced optical elements including an intermediate negative lens two outer doublet lenses that have the characteristics of positive lenses. The magnifiers are designed to enable the stereoscopic viewing of a map.

U.S. Pat. No. 3,586,418 (1971) to Abe discloses an eyepiece with four air-spaced optical devices between an object and pupil. The optical element closest to the object is a negative singlet lens. The remaining three optical elements include a singlet lens and two doublet lenses. Each of these three optical elements has the characteristics of positive lenses.

The foregoing references disclose lens forms with a minimal number of lens elements in an objective. However, the purpose of providing an image with these lens forms runs counter to a purpose, in many applications, of lens forms in eyepieces and other optical devices for providing a clear image.

For some eyepieces, it is important to consider eye relief in developing a lens form. As known, eye relief is the distance of the eye from the eye lens of an optical device that is best suited to the use of the optical system incorporating the eyepiece. U.S. Pat. No. 3,612,662 (1970) to Sissel discloses an eyepiece having a wide field of view and a predetermined eye relief of about 28 mm with an effective focal length of about 27.4 mm, a field of view of 48.98 degrees, a back focal length of 10.6 mm and an exit pupil of 10 mm. The eyepiece comprises, rearward from its front end facing the object, a double convex singlet, a negative meniscus-shaped double concave to the front, a positive meniscus-shaped doublet concave to the front, a double concave singlet, two double convex singlets and a positive meniscus-shaped doublet convex to the front.

U.S. Pat. No. 3,658,412 (1972) to Seaman discloses a wide angle binocular eyepiece with four air-spaced optical devices to provide a 75–80 mm eye relief, a field of view of 50° and an exit pupil of 80 mm. These devices include a positive meniscus lens convex to the observer, a concave-convex doublet consisting of a positive lens and a negative, a positive meniscus lens convex to the observer, and a positive concave-convex lens convex to the observer. When compared to the disclosure in U.S. Pat. No. 3,612,662, it can be seen that U.S. Pat. No. 3,658,412 reduces the number of optical elements from ten to four thereby tending to reduce the costs and weight of the resulting eyepiece.

Thus for each particular eyepiece application a lens designer must select from a variety of lens forms that satisfy requirements for eye relief, focal distances, field of view, image curvature, magnifications, aberrations and other factors. If a lens form is selected and then a parameter, such as eye relief, changes, that change, at a minimum, will require recalculation for some of the different optical element in the eyepiece. At the worst, such a change will require a complete lens redesign.

What is needed is a single lens form that can be used for designing a variety of optical devices, such as objectives, relays and eyepieces. Further, such a lens form should minimize the total number of optical elements and reduce the costs of manufacturing different optical elements. Preferably, the lens form should reduce the number of different types of optical elements in the optical device. What is also needed is a lens form that can be readily adapted for different applications and that can accommodate changes in parameters such as eye relief for eyepieces.

SUMMARY

Therefore it is an object of this invention to provide lens form that can be adapted for different optical device applications.

Another object of this invention is to provide a lens form that is adapted for different optical device applications and that limits the number of optical elements.

Yet another object of this invention is to provide a lens form that is adapted for different optical device applications and that limits the types of optical elements in the optical device.

Still another object of this invention is to provide a lens form that enables certain parameters of an optical device to be varied without a need to change the design of any optical element.

Still yet another object of this invention is to provide an eyepiece in which both the number of lenses and the number of lenses with different parameters are limited.

Yet still another object of this invention is to provide an eyepiece according to a lens form that is readily adapted to accommodate different values of eye relief.

In accordance with one aspect of this invention an optical system includes a housing extending along an axis with opposite open ends. The housing carries five air-spaced lens elements. A first lens element is intermediate the ends of the housing. Second and third lens elements are positioned seriatim on the axis between the first lens element and one end of the housing. Fourth and fifth lens elements are positioned seriatim on the axis between the first lens element and the other end of the housing. The first lens element has the characteristic of one of positive and negative lenses, and the second through fifth lens elements have the characteristics of the other of the positive and negative lenses and each of said second through fourth lens elements has a piano-convex shape.

In accordance with another aspect of this invention, an eyepiece for producing an image of an object in front of the eyepiece includes a housing extending along an axis with opposite open front and rear ends. The housing carries a negative lens and four identical positive lenses. The negative lens is intermediate the ends of the housing. First and second positive lenses are positioned seriatim between the negative lens and the front end of the housing. Third and fourth positive lenses are positioned seriatim between the negative lens and the rear end of the housing.

In accordance with another aspect of this invention an eyepiece is adapted for use with a night vision device with a phosphor output screen. The eyepiece can be focused relative to the output screen and comprises a housing, a negative lens and four identical positive lenses. The negative lens has an index of refraction of 1.923 and an Abbe number of 18.9 and is in the housing intermediate the front and rear ends. This negative lens has a front concave surface with a radius of 41.7068 mm, a rear concave surface with a radius of 78.466 mm and an axial thickness of 1.785 mm. Each positive lens has an index of refraction of 1.788, an Abbe number of 47.4, a front planar surface, a rear convex surface with a radius of 38.835 mm and an axial thickness of 4.050 mm. Each lens is mounted to the housing such that the distance between the first and second positive lenses is 0.524 mm, between the second positive and negative lenses is 7.175 mm, between the negative and third positive lenses is 1.351 mm and between the third and fourth positive lenses is 3.434 mm whereby the eyepiece has a distance from the front positive lens to the screen of 12.88 mm and an eye relief of 29 mm.

In accordance with yet another aspect of this invention, an eyepiece is adapted for use with a night vision device with a phosphor output screen. The eyepiece can be focused relative to the output screen and comprises a housing, a negative lens and four identical positive lenses. The negative lens has an index of refraction of 1.923 and an Abbe number of 18.9 and is in the housing intermediate the front and rear ends. This negative lens has a front concave surface with a radius of 41.7068 mm, a rear concave surface with a radius of 78.466 mm and an axial thickness of 1.785 mm. Each positive lens has an index of refraction of refraction of 1.788 and an Abbe number of 47.4, a front planar surface, a rear convex surface with a radius of 38.835 mm and an axial thickness of 4.050 mm. Each lens is mounted to the housing such that the distance between the first and second positive lenses is 3.511 mm, between the second positive and negative lenses is 4.54 mm, between the negative and third positive lenses is 2.151 mm and between the third and fourth positive lenses is 2.856 mm whereby the eyepiece has a distance from the front positive lens to the screen of 10.58 mm and an eye relief of 29 mm.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
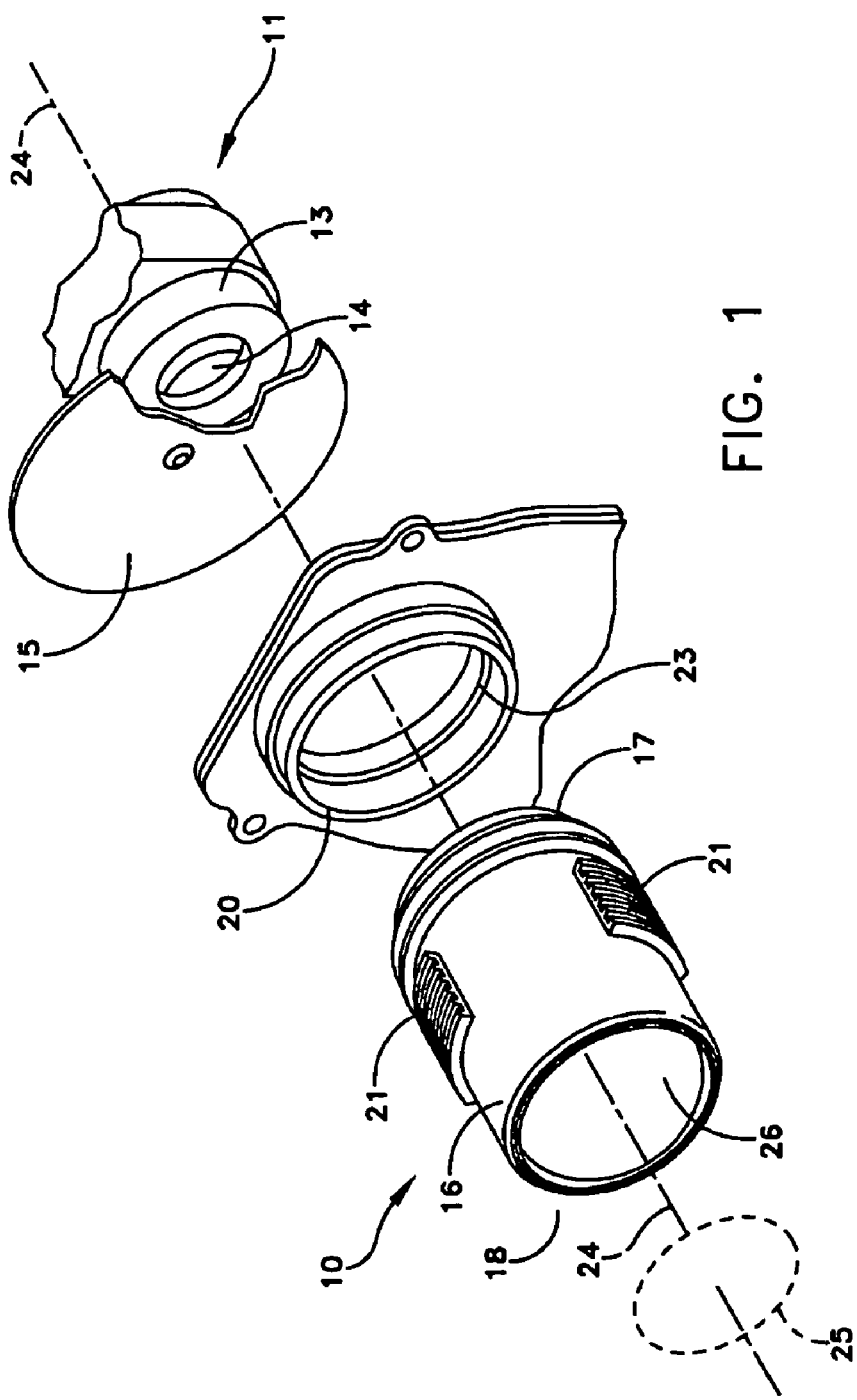
FIG. 1 is a perspective view of an application for this invention.

FIG. 1 depicts an optical device with a lens form in the form of an eyepiece 10 associated with an optical system in the form of a night vision system 11 all being mounted in or on a base, not shown. The night vision system 11 includes an image intensifier tube 13 with a phosphor output screen 14 for producing an object. FIG. 1 also depicts an optional filter 15 for the image on the output screen 14.

The eyepiece 10 includes a housing 16 with front and rear openings 17 and 18, respectively. In this disclosure the "front end" is the end of the eyepiece 10 that faces the object.

In this particular embodiment the eyepiece 10 includes a focus mechanism 20 including externally threaded segments 21 angularly spaced about the periphery of the housing 16 that engage an internal continuous thread 23 thereby to enable a user to advance or retract the housing 16 along an optical axis 24 for focus adjustment in a manner well known in the art.

The distance between an exit pupil 25 and the rear surface of an eye lens 26, which is one of several positive lenses in the eyepiece 10, defines the eye relief. Thus an individual using the apparatus shown in FIG. 1 positions her or her eye at an approximate distance from the eye lens 26 corresponding to the eye relief. The viewed image can then be focused to accommodate the user's eye.

Figure 2:
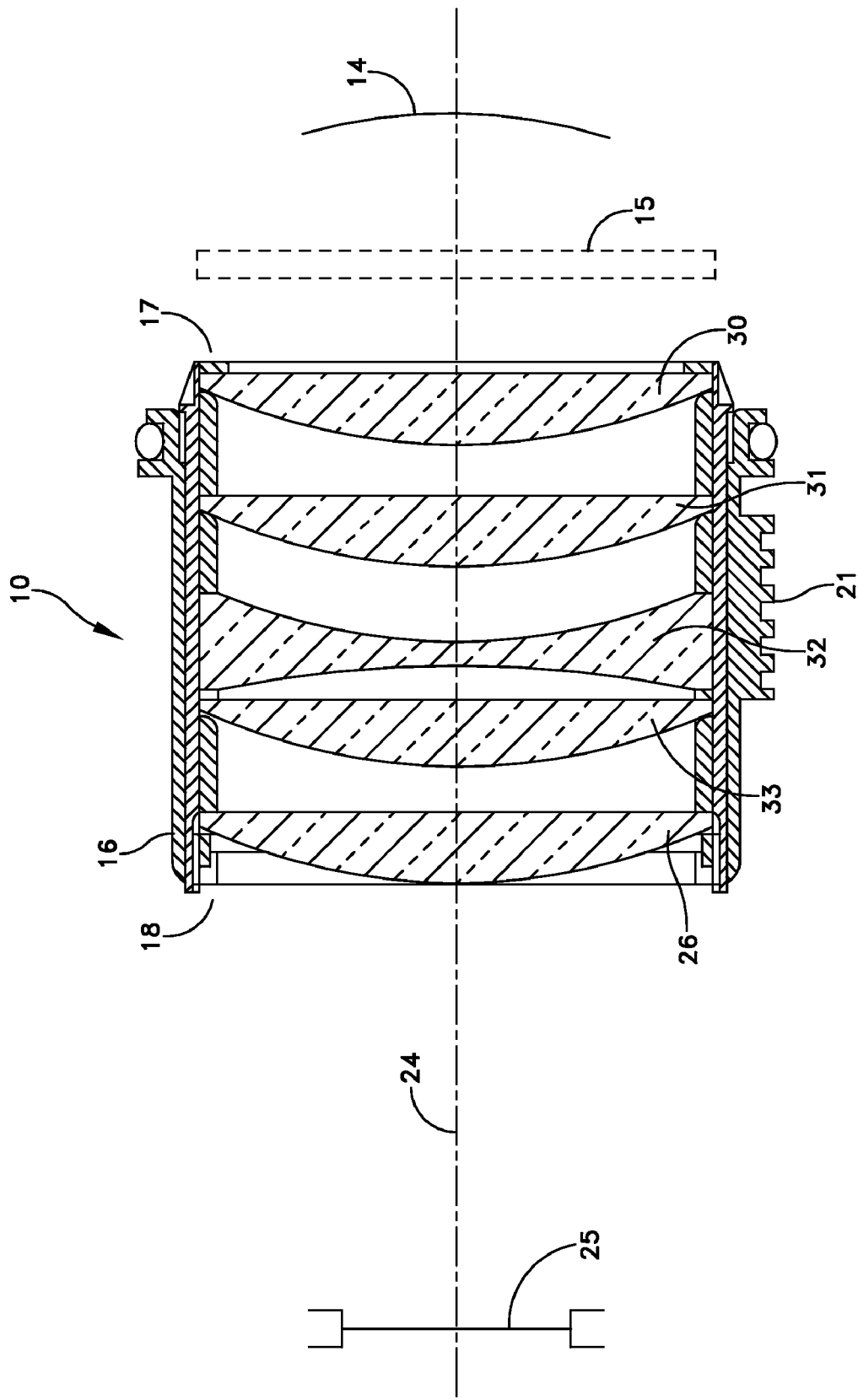
FIG. 2 is a cross section of an eyepiece as one embodiment of a lens form of this invention.

FIG. 2 depicts the lens form of this invention as an eyepiece 10 with five air-spaced optical elements in the form of lenses positioned in the housing 16. FIG. 2 also depicts the position of the eyepiece 10 relative to an object, such as the image intensifier tube screen 14 and the exit pupil 25. In this implementation of the lens form, the five air-spaced optical elements are constituted by five air-spaced singlet lenses including the positive eye lens 26 and, from the front to rear, positive lenses 30 and 31, a negative lens 32 and a positive lens 33. This implementation of the five-element lens form can provide a light-weight, compact eyepiece 10.

As shown in FIG. 2 the lenses 30, 31, 32 and 26 are piano-convex singlet lenses that have the characteristics of a positive lens while the singlet lens 32 is a bi-convex lens having the characteristics of a negative lens. This combination of positive and negative lenses provides a lens designer a degree of control over the Petzval Sum for the eyepiece 10. That is, the positive values of the lenses in the Petzval Sum contributed by the four positive lenses 26, 30, 31 and 33 and the negative value for the negative lens 32 provide an offset to each other to minimize the Petzval Sum. Such control is useful in matching the curvature of the screen 14 thereby to minimize the field curvature of the image produced by the eyepiece 10 or any other optical device incorporating this lens form.

An optical device incorporating this lens form may also provide another advantage. The eyepiece 10 includes four positive lenses 26, 30, 31 and 33 with identical design characteristics. Consequently, the lens form enables an optical device to be constructed with five optical elements taken from two different lens types. That is, the eyepiece only requires the design of one negative lens and one positive lens. This feature can improve manufacturing efficiency over those associated optical devices having five lenses or five different designs. The costs for acquiring four identical positive lenses can be less than for four different positive lenses. Moreover, during assembly it is only necessary to discriminate between a positive lens and a negative lens; there is no need to distinguish among a plurality of different positive lenses that differ only by dimensions.

The foregoing and other advantages can be more fully understood by considering the construction of two eyepieces, such as the eyepiece 10, for two applications in which object distance between the screen 14 in FIG. 2 and the lens 30 changes. Each example has common design criteria, namely:

| | |
|---|---|
| Object size: | 18 mm |
| Eye relief: | 29 mm |
| Exit pupil: | 14 mm |
| Apparent HFOV: | ≈20° |

With these inputs and other input characteristics for spherical and chromatic aberrations, coma and astigmatism, an eyepiece 10 has been constructed with the lens parameters shown in Table I:

TABLE I

| Lens Parameter | Positive Lens | Negative Lens |
|---|---|---|
| Front Radius | ∞ | −78.466 mm |
| Rear Radius | 38.835 mm | 41.7068 mm |

TABLE I-continued

| Lens Parameter | Positive Lens | Negative Lens |
|---|---|---|
| Center Thickness | 4.050 mm | 1.785 mm |
| Glass | SLAH 64 | SNPH 2 |
| Index of Refraction | 1.788 | 1.923 |
| Abbe Number | 47.4 | 18.9 |

Table II demonstrates how the lens form accommodates different distances from the object to the front lens without modifying the characteristics of the lenses in the eyepiece. Example 1 sets forth the lens spacing for a distance from the front lens to the object of 10.58 mm; Example 2, a distance of 12.88 mm.

TABLE II

| Spacing | Example 1 | Example 2 |
|---|---|---|
| Lens 30–Lens 31 | 3.511 mm | 0.524 mm |
| Lens 31–Lens 32 | 4.54 mm | 7.175 mm |
| Lens 32–Lens 33 | 2.151 mm | 1.351 mm |
| Lens 33–Lens 36 | 2.856 mm | 3.434 mm |
| Eye Relief | 29.00 mm | 29.00 mm |
| EFL | 27.05 mm | 26.80 mm |
| BFL | 10.58 mm | 12.88 mm |
| HFOV | 19.85° | 19.99° |
| Pupil | 14.00 mm | 14.00 mm |

More specifically, assume Example 1 is based on an original design requiring 10.58 mm space between the object and the front positive lens 30. Further assume that the design process later requires a greater distance. Example 2 shows that distance being increased to 12.88 mm. Both examples use the same lenses. The accommodation of this change is achieved merely by altering the spacing between adjacent lenses. Moreover other optical parameters of the eyepiece 10 do not change to any significant extent.

Figure 3:
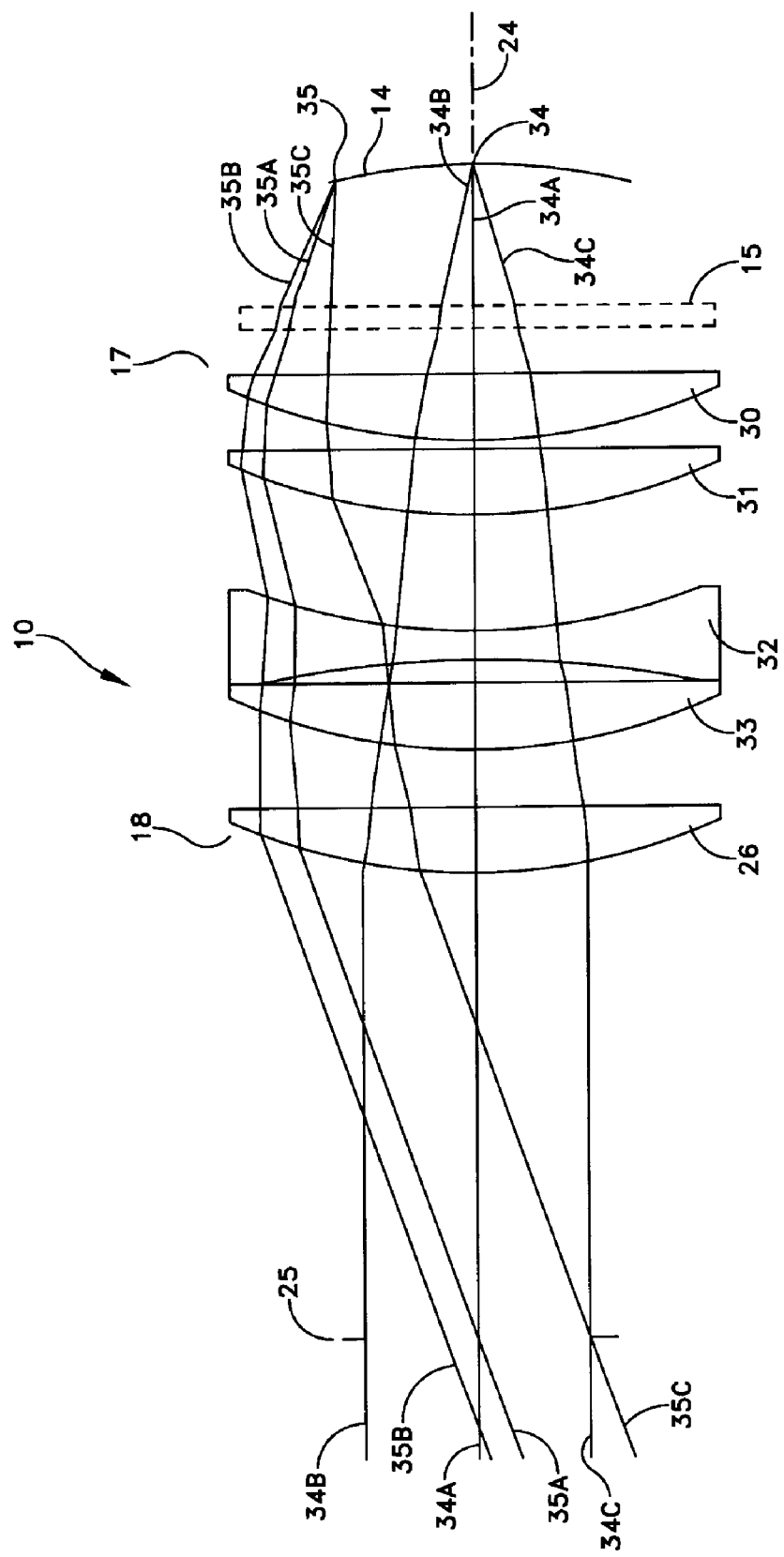
FIG. 3 is a ray trace for the eyepiece shown in FIG. 2.

FIG. 3 depicts a group of ray traces for an on-axis focus point 34 and an off-axis, or full-field, focus point 35. A chief ray trace 34A from the on-axis focus point 34 passes through the eyepiece 10 along the axis 24. An upper ray 34B and a lower ray 34C extend from the on-axis focus point 35 at an angle that represents the cone of light from the output screen 14 at the on-axis focus point 34 that would pass through a 14 mm diameter exit pupil at location 25.

Still referring to FIG. 3, the full-field focus point 35 is positioned at the periphery of the aperture for the output screen 14 and is shown with a chief ray 35A, upper ray 35B and lower ray 35C. The angle between the upper and lower rays 35B and 35C represents the cone of light from the output screen 14 at the full-axis focus point that would fill a 14 mm diameter exit pupil at location 25. Each of the rays 35A, 35B and 35C are parallel and pass through the exit pupil 25 at an angle. As known, the angle of the rays 35A, 35B and 35C to the axis 24 at the exit pupil 25 translates into the position of the full-field focus point 35 relative to the axis 24.

As also shown in FIG. 3, the upper ray 35B passes through the exit at a point offset from the optical axis 24. The transverse distance at the exit pupil 25 from the center axis 24 and the intersection of the ray 35B corresponds to the user's pupil. As the user rotates his or her eye, the eye receives rays of different angles that correspond to different positions on the screen 14. Consequently the user can scan the image over the entire field of view while maintaining the image intensifier tube in a constant position.

In low-light environments, including those that require the use of night vision equipment, transmission through the eyepiece 10 or other similar optical device may be enhanced by applying an anti-reflective coating. As such coatings are known in the art and very thin, they are not disclosed in the figures.

Thus the lens form shown in FIG. 2 provides a unique and powerful lens form for a range of optical devices. In addition to the specifically disclosed eyepiece 10, the five air-spaced element lens form has been used to design objective and relay optical devices. An optical device can be simply and easily constructed by limiting the five optical elements to singlet lenses. Manufacturing efficiencies can be realized by using four identical positive lenses. Certain design variations can be accommodated with this lens from merely by varying the spacing parameters. Thus, it is possible to accommodate changes in different user imposed requirements such as distances from the object to the eyepiece without having to redesign the entire eyepiece.

This invention has been disclosed with respect to an eyepiece that produces an image from the output of a curved surface object constituted by a curved image intensifier phosphor screen. It will be apparent that the design may be further altered to accommodate a flat planar object. An object may be an illuminated object or an illuminating object such as a lamp source. The disclosure describes a particular lens glass. Other glasses can be used. Any of the five singlet lenses that constitute the five air-spaced elements in this lens form can be replaced by a compound lens that has the appropriate positive or negative lens characteristics. Other variations will also be apparent to those of ordinary skill in the art. Therefore, it is the intent of the appended claims to cover all such variations and modifications as come within the true spirit and scope of this invention.

What is claimed is:

1. An optical system including a housing extending along an axis with opposite open ends and comprising, in said housing five air-spaced lens elements including:
    A) a first lens element on the axis intermediate said ends of said housing,
    B) second and third lens elements positioned seriatim on the axis between the first lens element and one end of the housing,
    C) fourth and fifth lens elements positioned seriatim on the axis between said first lens element and said other end of the housing, said first lens element having the characteristics of one of positive and negative lenses and said second through fifth lens elements having the characteristics of the other of the positive and negative lenses and each of said positive lens elements having a piano-convex shape.

2. An optical system as recited in claim 1 wherein said first lens element has the characteristics of a negative lens and said second through fifth lens elements have the characteristics of a positive lens.

3. An optical system as recited in claim 2 wherein each of said second through fifth lens elements are constituted by identical lens elements.

4. An optical system as recited in claim 2 wherein each of said first through fifth lens elements comprises a singlet lens.

5. An optical system as recited in claim 4 wherein said second through fifth lens elements are constituted by identical singlet lenses.

6. An eyepiece for producing an image of an object in the front of said eyepiece wherein said eyepiece includes a housing extending along an axis with opposite open front and rear ends and comprises, in said housing, a negative lens intermediate the ends of said housing and four identical positive lenses wherein first and second ones of said positive lenses are positioned seriatim between said negative lens and said front end of said housing and third and fourth ones of said positive lenses are positioned seriatim between said negative lens and said rear end of said housing.

7. An eyepiece as recited in claim 6 wherein each of said negative and first through fourth positive lenses is a singlet lens.

8. An eyepiece as recited in claim 7 wherein each of said first through fourth positive lenses is oriented in the same manner along the axis.

9. An eyepiece as recited in claim 6 wherein said negative lens is a bi-concave singlet lens and each of said positive lenses is a piano-convex singlet lens.

10. An eyepiece as recited in claim 9 wherein said positive lenses are oriented with their planar lens surfaces facing the same direction.

11. An eyepiece as recited in claim 9 wherein said positive lenses are oriented with their planar lens surfaces facing the front of said eyepiece.

12. An eyepiece as recited in claim 6 wherein:
    i) said negative lens comprises a material having an index of refraction of 1.923, an Abbe number of 18.9, a front concave surface with a radius of 41.7068 mm, a rear concave surface with a radius of 78.466 mm and an axial thickness of 1.785 mm,
    ii) each positive lens comprises a material having an index of refraction of 1.788, an Abbe number of 47.4, a front planar surface, a rear convex surface with a radius of 38.835 mm and an axial thickness of 4.050 mm, and
    iii) the distance from the object to said front surface of said first positive lens is 12.88 mm, the axial spacing between said lenses from front to rear are 0.524, 7.175, 1.351 and 3.434 mm respectively whereby said eyepiece has an eye relief of 29 mm.

13. An eyepiece as recited in claim 6 wherein:
    i) said negative lens comprises a material having an index of refraction of 1.923, an Abbe number of 18.9 and has a front concave surface with a radius of 41.7068 mm, a rear concave surface with a radius of 78.466 mm and an axial thickness of 1.785 mm,
    ii) each positive lens comprises a material having an index of refraction of 1.788, an Abbe number of 47.4 and has a front planar surface, a rear convex surface with a radius of 38.835 mm and an axial thickness of 4.050 mm, and
    iii) the distance from the object to said front surface of said first positive lens is 10.58 mm, the axial spacing between said lenses from front to rear are 3.511, 4.54, 2.151 and 2.856 mm, respectively whereby said eyepiece has an eye relief of 29 mm.

14. An eyepiece adapted for use with a night vision device including an output screen, said eyepiece comprising:
    A) a housing including means for adjusting the position of said eyepiece relative to the screen and having front and rear ends, and,
    B) five air spaced antireflective coated lenses in said housing including:
    i) a negative lens intermediate said front and rear ends of said housing comprising a material having an index of refraction of 1.923, an Abbe number of 18.9 and having a front concave surface with a radius of 41.7068 mm, a rear concave surface with a radius of 78.466 mm and an axial thickness of 1.785 mm, and
    ii) first through fourth identical positive lens, each said positive lens comprising a material having an index of refraction of 1.788, an Abbe number of 47.4 and having a front planar surface, a rear convex surface with a radius of 38.835 mm and an axial thickness of 4.050 mm, each lens being mounted to said housing such that the distance from the screen to a front surface of said first positive lens is 12.88 mm and such that the axial spacing between said lenses from front to rear are 0.524, 7.175, 1.351 and 3.434 mm, respectively.

15. An eyepiece adapted for use with a night vision device including an output screen, said eyepiece comprising:
  A) a housing including means for adjusting the position of said eyepiece relative to the screen and having front and rear ends, and,
  B) five air spaced antireflective coated lenses in said housing including:
  i) a negative lens intermediate said front and rear ends of said housing comprising a material having an index of refraction of 1.923, an Abbe number of 18.9 and having a front concave surface with a radius of 41.7068 mm, a rear concave surface with a radius of 78.466 mm and an axial thickness of 1.785 mm, and
  ii) first through fourth identical positive lens, each said positive lens comprising a material having an index of refraction of 1.788, an Abbe number of 47.4 and having a front planar surface, a rear convex surface with a radius of 38.835 mm and an axial thickness of 4.050 mm, each lens being mounted to said housing such that the distance from the screen to a front surface of said first positive lens is 10.58 mm and such that the axial spacing between said lenses from front to rear are 3.511, 4.54, 2.151 and 2.856 mm respectively.

* * * * *